United States Patent
Liu et al.

(10) Patent No.: US 10,671,656 B2
(45) Date of Patent: Jun. 2, 2020

(54) METHOD FOR RECOMMENDING TEXT CONTENT BASED ON CONCERN, AND COMPUTER DEVICE

(71) Applicant: BEIJING BAIDU NETCOM SCIENCE AND TECHNOLOGY CO., LTD., Beijing (CN)

(72) Inventors: Chengxiang Liu, Beijing (CN); Xinyan Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 15/859,800

(22) Filed: Jan. 2, 2018

(65) Prior Publication Data

US 2018/0373787 A1    Dec. 27, 2018

(30) Foreign Application Priority Data

Jun. 21, 2017  (CN) .......................... 2017 1 0475690

(51) Int. Cl.
*G06F 16/338* (2019.01)
*G06F 16/33* (2019.01)
*G06F 40/30* (2020.01)

(52) U.S. Cl.
CPC ........ *G06F 16/338* (2019.01); *G06F 16/3344* (2019.01); *G06F 16/3347* (2019.01); *G06F 40/30* (2020.01)

(58) Field of Classification Search
USPC ........................................................ 707/743
See application file for complete search history.

(56) References Cited

U.S. PATENT DOCUMENTS

| | | | |
|---|---|---|---|
| 2008/0140644 A1* | 6/2008 | Franks et al. ........... | G06F 17/30 707/999.005 |
| 2009/0037355 A1* | 2/2009 | Brave et al. ........ | G06F 16/9535 707/999.005 |
| 2017/0004129 A1* | 1/2017 | Shalaby et al. ......... | G06F 17/27 |
| 2018/0032508 A1* | 2/2018 | Matskevich et al. ........................ | G06F 17/2785 |

FOREIGN PATENT DOCUMENTS

| CN | 1489089 | 4/2004 |
|---|---|---|
| CN | 102930022 | 2/2013 |

OTHER PUBLICATIONS

SIPO, First Office Action for CN Application No. 201710475690.X, dated Feb. 3, 2020.

\* cited by examiner

*Primary Examiner* — Muluemebet Gurmu
(74) *Attorney, Agent, or Firm* — Hodgson Russ LLP

(57) ABSTRACT

A method for recommending a text content based on a concern, a computer device, and a non-transitory computer readable storage medium are provided. The method includes: acquiring a query input by a user, and acquiring a reference text content selected by the user from search results corresponding to the query; generating a term vector of the query according to a term relative to the query in the reference text content; determining the concern of the user from a plurality of reference concerns according to similarities between the term vector of the query and term vectors of the plurality of reference concerns; and recommending the text content matched with the concern to the user.

16 Claims, 5 Drawing Sheets

METHOD FOR RECOMMENDING TEXT CONTENT BASED ON CONCERN, AND COMPUTER DEVICE

CROSS REFERENCE TO RELATED APPLICATION

This application is based upon and claims a priority to Chinese Patent Application Serial No. 201710475690.X, filed with the Status Intellectual Property Office of P. R. China on Jun. 21, 2017, titled "Artificial intelligence-based mobile search method and apparatus", filed by BAIDU ONLINE NETWORK TECHNOLOGY (BEIJING) CO., LTD., the entire contents of which are incorporated herein by reference.

FIELD

The present disclosure relates to an information technology field, and more particularly to a method for recommending a text content based on a concern, and a computer device.

BACKGROUND

With a development of information technology, personalization information recommendation service based on a concern of a user has been become mainstream.

In related arts, in order to realize a personalization information recommendation, a positive subscription of the user is required. A user needs to search among candidate concerns provided by an application, and to acquire the information recommendation via the manual subscription.

However, in the method of positive subscription, the user is required to provide contents to be recommended. On one hand, user's operation is rather complicated; on the other hand, there may be problems that the contents to be recommended which are provided by the user are inaccurate, leading to a low accuracy of the personalization information recommendation in prior art.

SUMMARY

Embodiments of the present disclosure seek to solve at least one of the problems existing in the related art to at least some extent.

Accordingly, a first objective of the present disclosure is to provide a method for recommending a text content based on a concern.

A second objective of the present disclosure is to provide an apparatus for recommending a text content based on a concern.

A third objective of the present disclosure is to provide a computer device.

A fourth objective of the present disclosure is to provide a non-transitory computer readable storage medium.

A fifth objective of the present disclosure is to provide a computer program product.

In order to achieve the above objectives, embodiments of a first aspect of the present disclosure provide a method for recommending a text content based on a concern. The method includes: acquiring a query input by a user, and acquiring a reference text content selected by the user from search results corresponding to the query; generating a term vector of the query according to a term relative to the query in the reference text content; determining the concern of the user from a plurality of reference concerns according to similarities between the term vector of the query and term vectors of the plurality of reference concerns; and recommending the text content matched with the concern to the user.

In order to achieve the above objectives, embodiments of a second aspect of the present disclosure provide an apparatus for recommending a text content based on a concern. The apparatus includes: an acquiring module, configured to acquire a query input by a user, and to acquire a reference text content selected by the user from search results corresponding to the query; a generating module, configured to generate a term vector of the query according to a term relative to the query in the reference text content; a determining module, configured to determine the concern of the user from a plurality of reference concerns according to similarities between the term vector of the query and term vectors of the plurality of reference concerns; and a recommending module, configured to recommend the text content matched with the concern to the user.

In order to achieve the above objectives, embodiments of a third aspect of the present disclosure provide a computer device, including: a processor; and a memory configured to store computer programs executable by the processor. When the processor executes the computer programs, the method according to embodiments of the first aspect of the present disclosure is performed.

In order to achieve the above objectives, embodiments of a fourth aspect of the present disclosure provide a non-transitory computer readable storage medium storing computer programs, when the computer programs are executed by a processor, the method according to embodiments of the first aspect of the present disclosure is performed.

In order to achieve the above objectives, embodiments of a fifth aspect of the present disclosure provide a computer program product, including instructions. When the instructions are executed by a processor, the method according to embodiments of the first aspect of the present disclosure is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
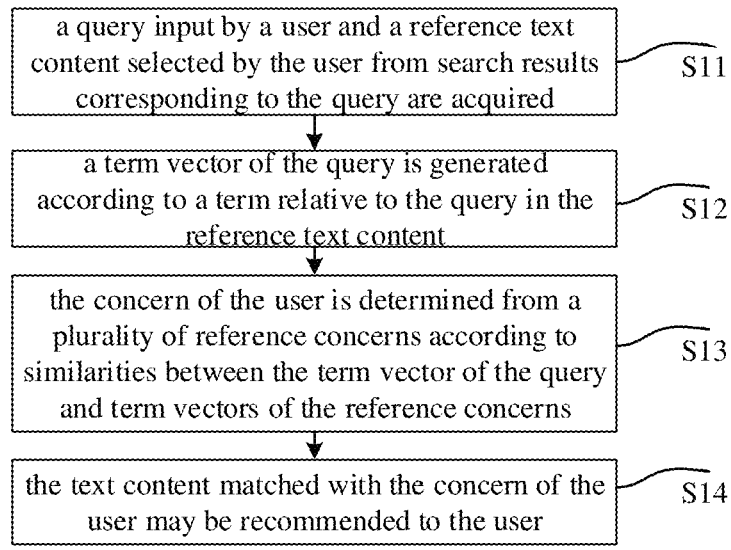
FIG. 1 is a flow chart of a method for recommending a text content based on a concern according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method and the apparatus for recommending a text content based on a concern according to embodiments of the present invention are hereinafter described with reference to accompanying drawings.

In prior art, there are two kinds of personalization information recommendations: a positive subscription and a relative information recommendation. The positive subscription has a drawback of high cost and it is difficult to realize the personalization information subscription when there are a lot of concerns. For the relative information recommendation, the accuracy of recommendation at early stage may be low, and a time period for realizing an accurate recommendation is long, which may cause a loss of users.

In order to solve the above problems, embodiments of the present disclosure provide a method for recommending a text content based on a concern, with which user's concern can be identified automatically, and a rapid, effective and precise personalization information recommendation can be realized.

FIG. 1 is a flow chart of a method for recommending a text content based on a concern according to an embodiment of the present disclosure.

As shown in FIG. 1, the method may include followings.

At block S11, a query input by a user and a reference text content selected by the user from search results corresponding to the query are acquired.

When the user desires to know about something, the user may input a query in a search box of a search engine or an application having a search function. In this case, the search function of the search engine or the application may be triggered, and the search engine or the application may acquire the query input by the user, and acquire search results related to the query from a server and display the search results to the user. The user may select contents having a high matching degree from the search results to view.

In this embodiment, in order to analyze the user's preference so as to identify a concern of the user, the query input by the user may be acquired from a browsing log of the search engine or the application, and a result selected by the user from the search results corresponding to the query input by the user may be determined as the reference text content.

At block S12, a term vector of the query is generated according to a term relative to the query in the reference text content.

Specifically, after the reference text content is acquired, a statistic may be performed on terms included in the reference text content to acquire terms related to the query, and the term vector of the query is generated according to the terms related to the query in the reference text content. Each component of the term vector corresponds to a term related to the query in the reference text content.

It should be noted that the term vector may be generated using methods in prior art, which will not be described in detail herein.

At block S13, the concern of the user is determined from a plurality of reference concerns according to similarities between the term vector of the query and term vectors of the plurality of reference concerns.

As a possible implementation, before the concern is predicted, candidate concerns (i.e., the plurality of reference concerns in embodiments of the present disclosure) may be determined in advance. Specifically, for mining the plurality of reference concerns, search behaviors of all users may be analyzed. The queries input by the users are determined as the reference concerns, and the search results selected by the users from search results corresponding to the reference concerns are acquired. Further, terms having similar semanteme as corresponding reference concerns may be extracted from the search results selected by all the users, and the term vectors of the reference concerns may be generated using relative techniques according to the terms extracted.

Therefore, the concern of the user is determined from the plurality of reference concerns according to similarities between the term vector of the query and the term vectors of the plurality of reference concerns.

For example, cosine similarities between the term vector of the query and the term vectors of the plurality of reference concerns may be computed. Specifically, the term vector of the query and the term vectors of the plurality of reference concerns may be plotted in a vector space according to coordinate values, and included angles between the term vector of the query and the term vectors of the reference concerns may be computed respectively. After that, similarities between the term vector of the query and the term vectors of the reference concerns may be represented in a form of cosines corresponding to the included angles. In other words, the smaller the included angle is, the closer the cosine approaches to 1, and the higher the similarity between the term vector of the query and the term vector of the reference concern is. The reference concern having the highest similarity may be determined as the concern of the user.

At block S14, the text content matched with the concern of the user may be recommended to the user.

In this embodiment, after the concern of the user is determined, a text content matched with the concern of the user may be acquired and recommended to the user.

With the method for recommending a text content based on a concern according to embodiments of the present disclosure, as the identification of the user's concern is performed in background automatically, when the user launches the search engine or the application (such as Baidu Mobile), the user can acquire the recommended personalization information at the first time, which is rapid and effective.

With the method for recommending a text content based on a concern according to embodiments of the present disclosure, by acquiring a query input by a user and a reference text content selected by the user from search results corresponding to the query, generating a term vector of the query according to a term relative to the query in the reference text content, determining the concern of the user from a plurality of reference concerns according to similarities between the term vector of the query and term vectors of the plurality of reference concerns and recommending the text content matched with the concern of the user to the user, user's concern may be identified automatically, and a rapid, effective and precise personalization information recommendation may be realized, thereby improving an accuracy for identifying a concern and recommending contents.

Figure 2:
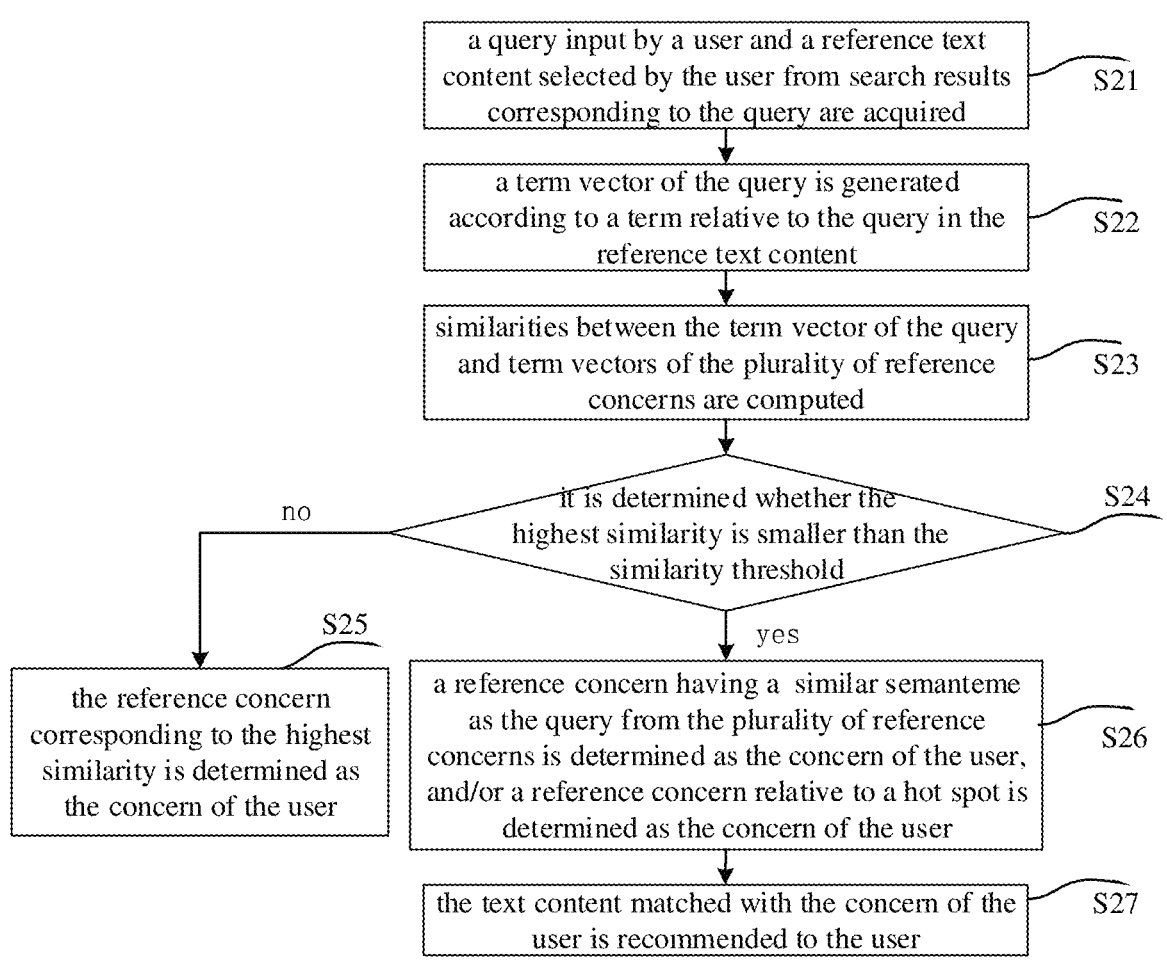
FIG. 2 is a flow chart of a method for recommending a text content based on a concern according to another embodiment of the present disclosure.

In order to further improve the accuracy for identifying the concern, in a possible implementation of the present disclosure, a similarity threshold may be preset. In the embodiment described with reference to FIG. 1, the highest similarity among similarities computed according to the term vector of the query and term vectors of the plurality of reference concerns may be compared to the similarity threshold. If the highest similarity is greater than or equal to the similarity threshold, the reference concern corresponding to the highest similarity is determined as the concern of the user; otherwise, the concern of the user may be further determined based on a semantic similarity. As shown in FIG. 2, the method for recommending a text content based on a concern may include followings.

At block S21, a query input by a user and a reference text content selected by the user from search results corresponding to the query are acquired.

At block S22, a term vector of the query is generated according to a term relative to the query in the reference text content.

It should be noted that, regarding the description of blocks S21-S22, reference may be made to the description of blocks S11-S12, which will not be described in detail herein.

At block S23, similarities between the term vector of the query and term vectors of the plurality of reference concerns are computed.

As a possible implementation, before the concern is predicted, candidate concerns (i.e., the plurality of reference concerns in embodiments of the present disclosure) may be determined in advance. Specifically, for mining the plurality of reference concerns, search behaviors of all users may be analyzed. The queries input by all the users are determined as the reference concerns, and the search results selected by all the users from search results corresponding to the reference concerns are acquired. Further, terms having similar semanteme as the reference concerns may be extracted from the search results selected by all the users, and the term vectors of the reference concerns may be generated using relative techniques according to the terms extracted.

Therefore, in this embodiment, the similarities (such as the cosine similarities) between the term vector of the query and term vectors of the plurality of reference concerns are computed, and the highest similarity may be determined from the results.

At block S24, it is determined whether the highest similarity is smaller than the similarity threshold.

The similarity threshold may be preset according to experience or a desired identification accuracy, which will not be limited herein.

In this embodiment, after the similarities between the term vector of the query and term vectors of the plurality of reference concerns are computed, the highest similarity among the similarities may be acquired. After that, the highest similarity is compared to the similarity threshold and it is determined whether the highest similarity is smaller than the similarity threshold. If the highest similarity is greater than or equal to the similarity threshold, an act at block S25 will be performed; otherwise, an act at block S26 will be performed.

At block S25, the reference concern corresponding to the highest similarity is determined as the concern of the user.

In this embodiment, when the highest similarity is greater than or equal to the similarity threshold, it may indicate that a matching degree between the term vector of the reference concern corresponding to the highest similarity and the term vector of the query is high, such that the reference concern corresponding to the highest similarity may be regarded as the concern of the user.

At block S26, a reference concern having a similar semanteme as the query from the plurality of reference concerns is determined as the concern of the user, and/or a reference concern relative to a hot spot is determined as the concern of the user.

In this embodiment, when the highest similarity is smaller than the similarity threshold, semantic similarities between the query and the reference concerns may be computed, for example, by adopting a general regression neural network (GRNN for short). The reference concern having a similar semanteme as the query in the plurality of reference concerns (i.e., the reference concern having the highest semantic similarity) may be determined as the concern of the user; and/or, the reference concern relative to a hot spot may be determined as the concern of the user. The identification of the hot spot may be ensured by using a named entity (such as an entity marked with a name of a person, of an organization, of a location), such that the reference concern relative to the hot spot is determined as the concern of the user.

At block S27, the text content matched with the concern of the user is recommended to the user.

In this embodiment, after the concern of the user is determined, the text content matched with the concern of the user may be recommended to the user.

For example, when the user inputs the query "what about the box office earning of World of Warcraft", "a statistic of box office earning of World of Warcraft", "box office data of World of Warcraft" or the like, it may be determined by the method provided in embodiments of the present disclosure that the concern of the user is "World of Warcraft", such that the text content related to the box office earning of World of Warcraft may be recommended to the user.

With the method for recommending a text content based on a concern according to embodiments of the present disclosure, a similarity threshold may be preset. The highest similarity among similarities computed according to the term vector of the query and term vectors of the plurality of reference concerns may be compared to the similarity threshold. If the highest similarity is greater than or equal to the similarity threshold, the reference concern corresponding to the highest similarity is determined as the concern of the user; otherwise, a reference concern having a similar semanteme as the query from the plurality of reference concerns is determined as the concern of the user, and/or a reference concern relative to a hot spot is determined as the concern of the user. And then the text content matched with the concern of the user can be recommended to the user. In this way, the accuracy for identifying the concern of the user, thus the accuracy for recommending contents can be improved.

In order to describe the process for recommending the text content matched with the concern of the user more clearly, embodiments of the present disclosure provide another method for recommending a text content based on a concern.

Figure 3:
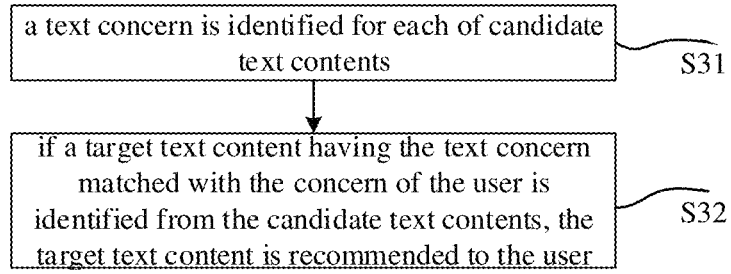
FIG. 3 a flow chart of a method for recommending a text content based on a concern according to a still embodiment of the present disclosure.

FIG. 3 a flow chart of a method for recommending a text content based on a concern according to a still embodiment of the present disclosure.

As shown in FIG. 3, based on the above-mentioned embodiments, the method for recommending the text content matched with the concern of the user may include followings.

At block S31, a text concern is identified for each of candidate text contents.

In this embodiment, after the concern of the user is determined, related text content may be acquired according to the concern of the user and determined as the candidate text content, such that the text concern is identified from the candidate text content.

Figure 4:
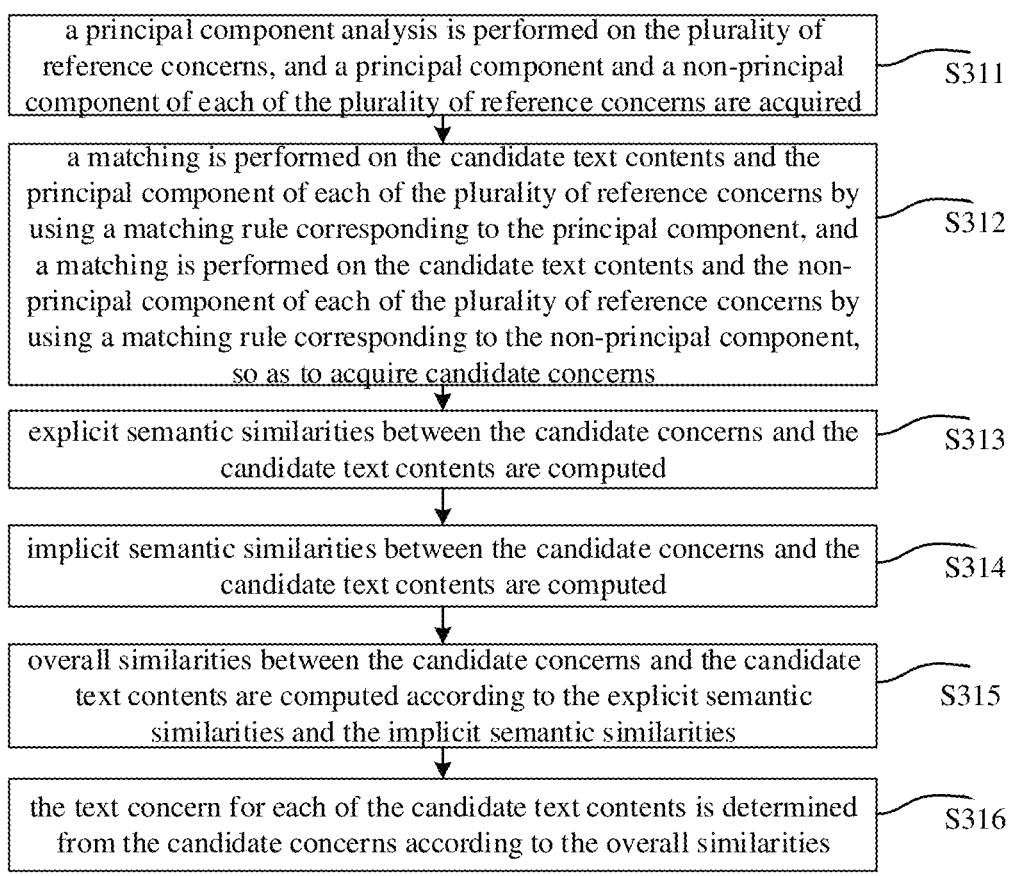
FIG. 4 is a schematic diagram of a process of identifying a text concern for each of candidate text contents according to an embodiment of the present disclosure.

Specifically, as shown in FIG. 4, for each of the candidate text contents, identifying the text concern may include followings.

At block S311, a principal component analysis is performed on the plurality of reference concerns, and a principal component and a non-principal component of each of the plurality of reference concerns are acquired.

The semantic significance of the principal component is greater than a semantic significance of the non-principal component.

In this embodiment, the principal component analysis may be performed on the plurality of reference concerns (i.e., queries input by all users) by using relative analysis methods, and the principal component and the non-principal component of each of the plurality of reference concerns are acquired, such that a problem that it is difficult to realize matching when the concern is long may be solved.

At block S312, a matching is performed on the candidate text contents and the principal component of each of the plurality of reference concerns by using a matching rule corresponding to the principal component, and a matching is performed on the candidate text contents and the non-principal component of each of the plurality of reference concerns by using a matching rule corresponding to the non-principal component, so as to acquire candidate concerns.

The matching rule corresponding to the principal component and the matching rule corresponding to the non-principal component may be preset according to experience and/or practical requirements, which will not be limited herein. For example, the matching rule corresponding to the principal component may refer to that the principal component appears at least five times in the text content, and the matching rule corresponding to the non-principal component may refer to that the non-principal component appears once in the text content. In this embodiment, the principal component determination is performed on the reference concern and a part mainly representing the concern is regarded as the principal component, which may avoid a concern identification error caused by a mismatching of the non-principal component and improve the concern identification accuracy to some extent. In this embodiment, the matching is performed on the candidate text contents and the principal component and on the candidate text contents and the non-principal component of each of the plurality of reference concerns by using the preset matching rule corresponding to the principal component and the preset matching rule corresponding to the non-principal component, so as to acquire candidate concerns matched. Depending on the acquired principal components and non-principal components, by using the matching rules corresponding to the principal component and the non-principal component, on the one hand, the principal component is regarded as a part mainly representing the concern to perform a precise matching, on the other hand, the non-principal component is regarded as a part auxiliary representing the concern to perform an auxiliary matching, such that the matching accuracy may be improved.

Preferably, the reference concern having the principal component and the non-principal component respectively matched with those of the candidate text content and coming from the plurality of reference concerns may be regarded as the candidate concern.

Further, in a case that there is no reference concern having the principal component and the non-principal component respectively matched with those of the candidate text content in the plurality of reference concerns, the reference concern having the principal component matched with that of the candidate text content and coming from the plurality of reference concerns may be regarded as the candidate concern.

At block S313, explicit semantic similarities between the candidate concerns and the candidate text contents are computed.

Specifically, the explicit semantic similarities between the candidate concerns and the candidate text contents may be computed according to the term vectors of the candidate text contents and term vectors of the candidate concerns.

When computing the term vectors of the candidate text contents, a segmentation may be performed on the candidate text contents using relative segmenting methods. The number of occurrences of terms acquired after the segmentation in the candidate text contents may be counted, and high-frequency terms may be acquired, and the term vectors of the candidate text contents may be generated according to the high-frequency terms. As the term vectors of the reference concerns are generated in above-mentioned embodiments, and the candidate concerns are selected from the reference concerns, the term vectors of the candidate concerns may be acquired directly.

In this embodiment, after the term vectors of the candidate text contents and term vectors of the candidate concerns are acquired, the explicit semantic similarities between the candidate concerns and the candidate text contents may be computed according to the term vectors of the candidate text contents and term vectors of the candidate concerns. For example, the explicit semantic similarities may be determined by computing distances between the term vectors of the candidate text contents and term vectors of the candidate concerns. The smaller the distance is, the higher the explicit semantic similarity is; the greater the distance is, the lower the explicit semantic similarity is.

At block S314, implicit semantic similarities between the candidate concerns and the candidate text contents are computed.

Specifically, when computing the implicit semantic similarities between the candidate concerns and the candidate text contents, the candidate text contents are input into an implicit semantic predicting model, such that relevancies between the candidate text contents and the candidate concerns are acquired and regarded as the implicit semantic similarities.

The implicit semantic predicting model is pre-trained by performing an implicit semantic training using a concern-tagged training text. When the training is performed, the concern corresponding to the training text and prediction results under an explicit semanteme may be regarded as a positive example, and a random concern and the results not selected under the explicit semanteme may be regarded as a negative example. A deep neural network (DNN for short) or a machine learning model SimNet may be used to perform the training, to obtain the implicit semantic predicting model.

At block S315, overall similarities between the candidate concerns and the candidate text contents are computed according to the explicit semantic similarities and the implicit semantic similarities.

A linear weighting may be used to acquire the overall similarities according to the explicit semantic similarities and the implicit semantic similarities.

At block S316, the text concern for each of the candidate text contents is determined from the candidate concerns according to the overall similarities.

In this embodiment, after the overall similarities are acquired, the text concern for each of the candidate text contents is determined from the candidate concerns according to the overall similarities. For example, the candidate concern having the highest overall similarity may be regarded as the text concern.

Figure 5A:
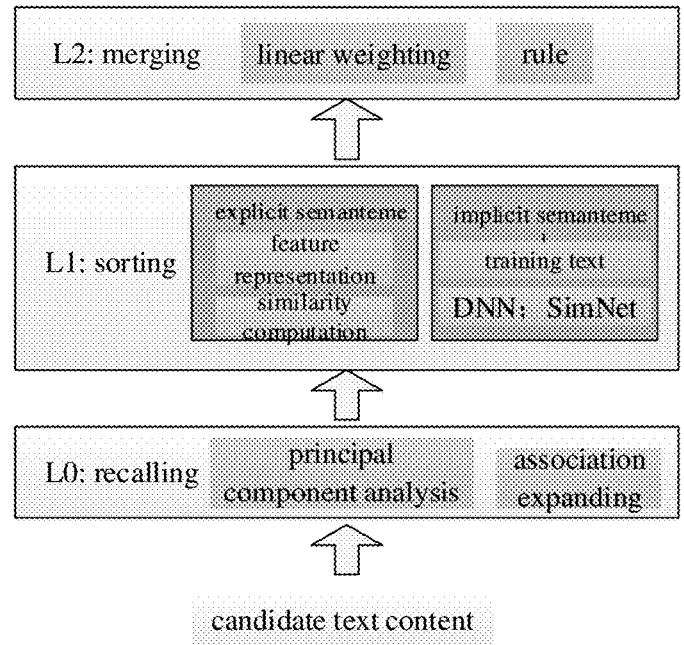
FIG. 5(a) is a schematic diagram of process of identifying a text concern according to an embodiment of the present disclosure.

FIG. 5(a) is a schematic diagram of a process of identifying a text concern.

As shown in FIG. 5(a), the process for identifying text concern may include three layers.

L0: recalling. The candidate concerns are recalled on this layer. The layer L0 may include a principal component analysis and an association expanding.

The principal component analysis is mainly used to resolve the problem of high matching difficulty caused by low association when the reference concern is long. Significance of different segments of the candidate text contents with respect to the reference concerns can be acquired by the principal component analysis, and the matching rule corresponding to the principal component and the matching rule corresponding to the non-principal component are established.

The association expanding refers to expanding based on associations between the reference concerns. The associations mainly refer to hierarchical relations. For example, "automatic drive" belongs to "artificial intelligence".

Figure 5B:
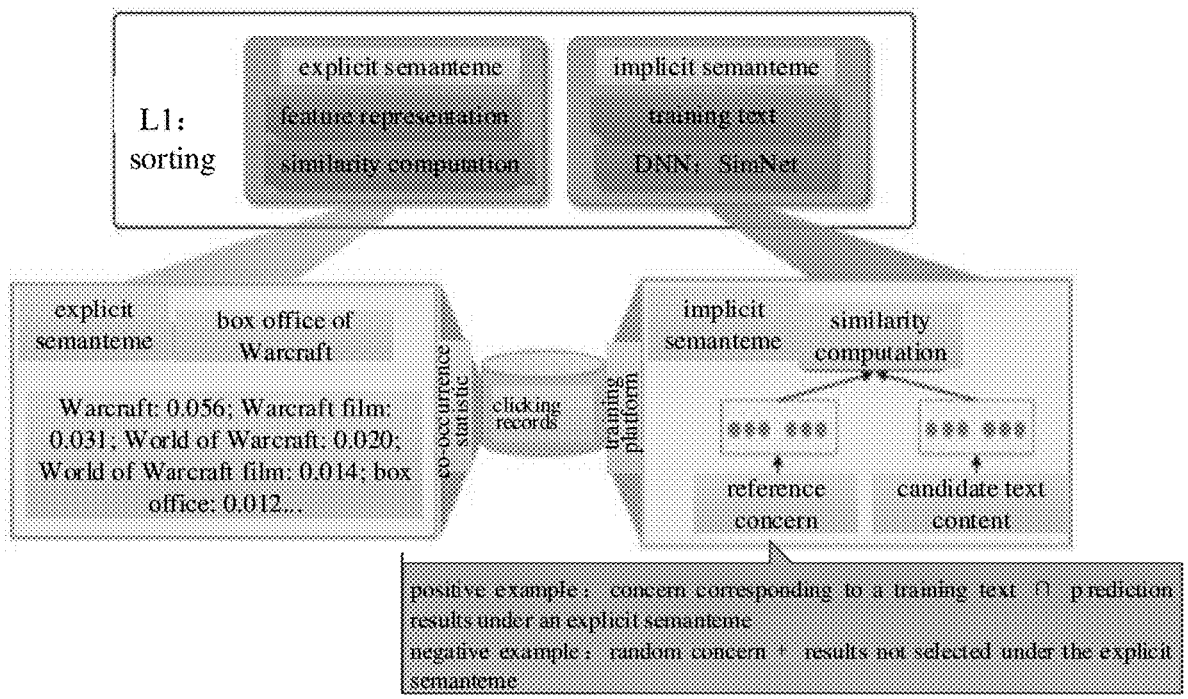
FIG. 5(*b*) is a schematic diagram of processes of computing explicit semantic similarities and implicit semantic similarities according to an embodiment of the present disclosure.

L1: sorting. The explicit semantic similarities and the implicit semantic similarities are computed on this layer. FIG. 5(b) is a schematic diagram of processes of computing the explicit semantic similarities and the implicit semantic similarities.

As shown in FIG. 5(b), when computing the explicit semantic similarities, a co-occurrence statistic may be performed based on clicking records corresponding to the reference concerns. For example, term frequency-inverse document frequency (TF-IDF for short) may be used to perform the co-occurrence statistic, such that feature representations (i.e., term vector representations) of the candidate text contents and the candidate concerns may be acquired, and the explicit semantic similarities may be computed. It can be seen from FIG. 5(b) that, when the candidate concern is "box office of Warcraft", the explicit semantic similarity between "Warcraft" in the candidate text content and "box office of Warcraft" is 0.056, the explicit semantic similarity between "Warcraft film" and "box office of Warcraft" is 0.031, the explicit semantic similarity between "World of Warcraft" and "box office of Warcraft" is 0.020, the explicit semantic similarity between "World of Warcraft film" and "box office of Warcraft" is 0.014, and the explicit semantic similarity between "box office" and "box office of Warcraft" is 0.012.

Compared to the explicit semantic similarities, the implicit semantic similarities have a better generalization ability. As shown in FIG. 5(b), before computing the implicit semantic similarities, a training may be performed on the DNN model or the SimNet model based on the clicking records of the reference concerns firstly, and the implicit semantic predicting model may be acquired, and relations between the reference concerns and the clicking records are established. Scores of the relevancies (i.e., the implicit semantic similarities) may be acquired by inputting the candidate text contents into an implicit semantic predicting model.

L2: merging. The explicit semantic similarities and the implicit semantic similarities are merged based on a rule and the linear weighting, such that the overall similarities between the candidate concerns and the candidate text contents are acquired. The main function of rule is to exclude results with obvious errors. The objective of linear weighting is to ensure a rationality of the order of the candidate concerns.

In this embodiment, a principal component analysis is performed on the plurality of reference concerns, the candidate concerns may be acquired according to the matching rule corresponding to the principal component and the matching rule corresponding to the non-principal component, the explicit semantic similarities and the implicit semantic similarities between the candidate concerns and the candidate text contents are computed, and the overall similarities are computed. Therefore, the text concerns of the candidate text contents may be determined according to the overall similarities, the sorting of the concerns may be optimized, the accuracy of identifying the text concerns may be improved, such that the text concerns are representative.

At block S32, if a target text content having the text concern matched with the concern of the user is identified from the candidate text contents, the target text content is recommended to the user.

In this embodiment, a matching is performed on the determined text concerns and the concern of the user, when there is a text concern in the candidate text contents which is matched to the concern of the user, the corresponding candidate text content may be regarded as the target text content to be recommended to the user.

With the method for recommending a text content based on a concern according to embodiments of the present disclosure, text concerns for the candidate text contents can be identified, and when a target text content having the text concern matched with the concern of the user is identified from the candidate text contents, the target text content is recommended to the user, such that an accuracy for recommending contents is further improved.

In order to achieve the above embodiments, the present disclosure provides an apparatus for recommending a text content based on a concern.

Figure 6:
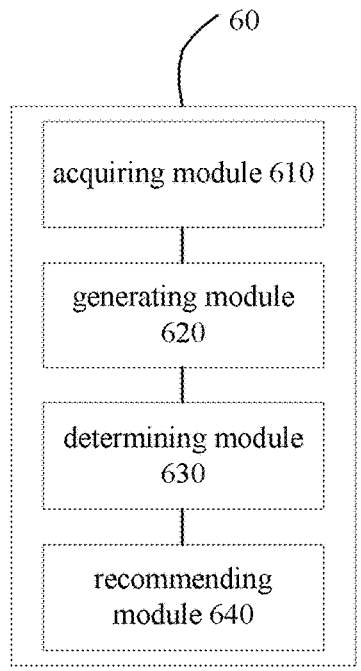
FIG. 6 is a block diagram of an apparatus for recommending a text content based on a concern according to an embodiment of the present disclosure.

FIG. 6 is a block diagram of an apparatus for recommending a text content based on a concern according to an embodiment of the present disclosure.

As shown in FIG. 6, the apparatus 60 may include: an acquiring module 610, a generating module 620, a determining module 630 and a recommending module 640.

The acquiring module 610 is configured to acquire a query input by a user, and to acquire a reference text content selected by the user from search results corresponding to the query.

The generating module 620 is configured to generate a term vector of the query according to a term relative to the query in the reference text content.

The determining module 630 is configured to determine the concern of the user from a plurality of reference concerns according to similarities between the term vector of the query and term vectors of the plurality of reference concerns.

The recommending module 640 is configured to recommend the text content matched with the concern to the user.

Figure 7:
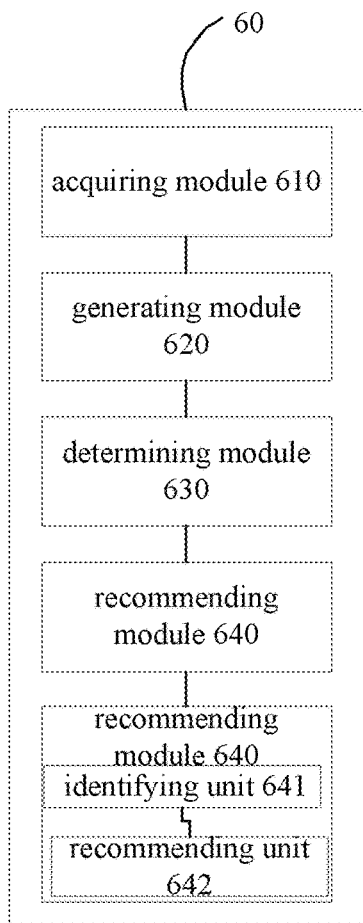
FIG. 7 is a block diagram of an apparatus for recommending a text content based on a concern according to another embodiment of the present disclosure.

Further, in a possible implementation, as shown in FIG. 7, the apparatus 60 also includes a processing module 650, configured to determine a reference concern having a similar semanteme as the query from the plurality of reference concerns as the concern of the user, and/or to determine a reference concern relative to a hot spot as the concern of the user.

The recommending module 640 includes an identifying unit 641 and a recommending unit 642.

The identifying unit 641 is configured to identify a text concern for each of candidate text contents.

Specifically, the identifying unit 641 is configured to: perform a principal component analysis on the plurality of reference concerns, and acquire a principal component and a non-principal component of each of the plurality of reference concerns, in which a semantic significance of the principal component is greater than a semantic significance of the non-principal component; match the candidate text contents to the principal component of each of the plurality of reference concerns by using a matching rule corresponding to the principal component, and match the candidate text contents to the non-principal component of each of the plurality of reference concerns by using a matching rule corresponding to the non-principal component, so as to acquire candidate concerns; compute explicit semantic similarities between the candidate concerns and the candidate text contents; compute implicit semantic similarities between the candidate concerns and the candidate text contents; acquire overall similarities between the candidate concerns and the candidate text contents according to the explicit semantic similarities and the implicit semantic similarities; and determine the text concern for each of the candidate text contents from the candidate concerns according to the overall similarities.

The recommending unit 642 is configured to recommend the target text concern to the user if a target text content having the text concern matched with the concern of the user is identified from the candidate text contents.

It should be noted that the description of embodiments of the method for recommending a text content based on a concern may be also suitable to embodiments of the apparatus, which will not be described in detail herein.

With the apparatus for recommending a text content based on a concern according to embodiments of the present disclosure, a query input by a user and a reference text content selected by the user from search results corresponding to the query can be acquired. A term vector of the query can be generated according to a term relative to the query in the reference text content. The concern of the user can be determined from a plurality of reference concerns according to similarities between the term vector of the query and term vectors of the plurality of reference concerns. The text content matching the concern can be recommended to the user. Therefore, user's concern can be identified automatically, such that a rapid, effective and precise personalization information recommendation can be realized, thereby improving an accuracy for identifying a concern and recommending contents.

In order to achieve the above embodiments, the present disclosure also provides a computer device.

Figure 8:
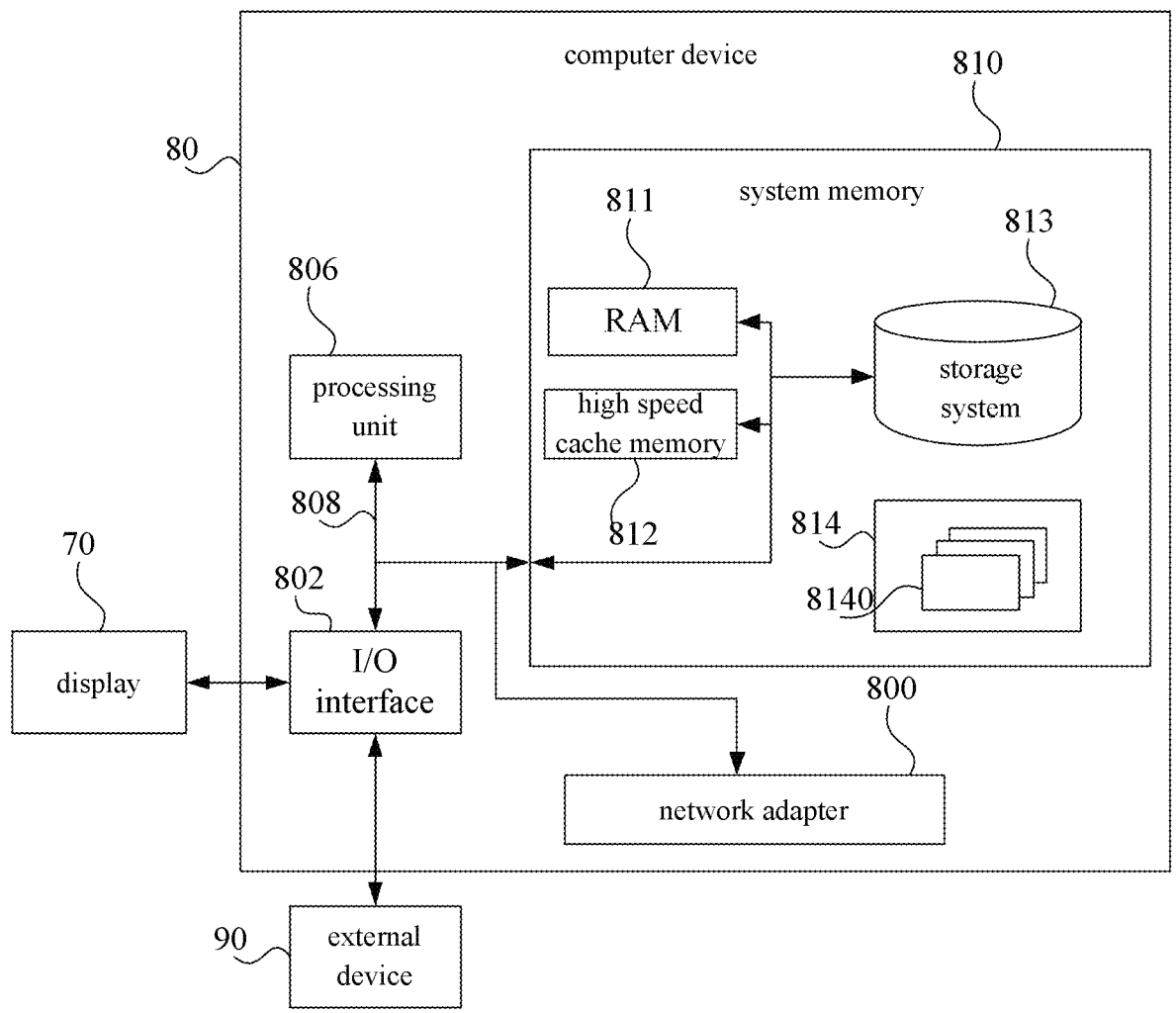
FIG. 8 is a structure diagram of a computer device according to an embodiment of the present disclosure.

FIG. 8 is a structure diagram of a computer device according to an embodiment of the present disclosure. The computer device includes a processor; and a memory configured to store computer programs executable by the processor. When the processor executes the computer programs, the method according to embodiments of the first aspect of the present disclosure is performed.

The computer device in embodiments may function as a server, or as a smart terminal such as a client device, a personal computer, a pad or a mobile phone, which is not limited herein.

FIG. 8 illustrates a block diagram of an exemplary computer device 80 suitable for realizing implementations of the present disclosure. The computer device 80 illustrated in FIG. 8 is merely an example, which should be not understood as a limitation on the functions and usage scope of embodiments of the present disclosure.

As illustrated in FIG. 8, the computer device 80 may be represented in a form of a general-purpose computing device. Components of the computer device 80 may include but are not limited to one or more processors or processing units 806, a system memory 810, a bus 808 connecting various system components including the system memory 810 and the processing units 806.

The bus 808 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 80 typically includes a variety of computer system readable media. These media may be any available media accessible by the computer device 80 and includes both volatile and non-volatile media, removable and non-removable media.

The system memory 810 may include a computer system readable medium in the form of volatile memory, such as a random access memory (hereinafter referred to as RAM) 811 and/or a high speed cache memory 812. The computer device 80 may further include other removable or non-removable, volatile or non-volatile computer system storage medium. By way of example only, the storage system 813 may be configured to read and write a non-removable and non-volatile magnetic media (not shown in FIG. 8, commonly referred to as a "hard drive"). Although not shown in FIG. 8, a magnetic disk driver for reading from and writing to a removable and non-volatile magnetic disk (such as "floppy disk") and a disk driver for reading from and writing a removable and non-volatile optical disk (such as compact disk read only memory (hereinafter referred to as CD-ROM), Digital Video Disc Read Only Memory (hereinafter referred to as DVD-ROM) or other optical medium can be provided. In these cases, each driver may be connected to the bus 808 via one or more data medium interfaces. The memory 810 may include at least one program product. The program product has a set (such as, at least one) of program modules configured to perform the functions of various embodiments of the present disclosure.

A program/utility 814 having a set (at least one) of the program modules 8140 may be stored in, for example, the memory 810. The program modules 8140 include but are not limited to, an operating system, one or more application programs, other programs modules, and program data. Each of these examples, or some combination thereof, may include an implementation of a network environment. The program modules 8140 generally perform the functions and/or methods in the embodiments described herein.

The computer device 80 may also communicate with one or more external devices 90 (such as, a keyboard, a pointing device, a display 70, etc.). Furthermore, the computer device 80 may also communicate with one or more devices enabling a user to interact with the computer device 80 and/or other devices (such as a network card, modem, etc.) enabling the computer device 80 to communicate with one or more computer devices. This communication can be performed via the input/output (I/O) interface 802. Also, the computer device 80 may communicate with one or more networks (such as a local area network (hereafter referred to as LAN), a wide area network (hereafter referred to as WAN) and/or a public network such as an Internet) through a network adapter 800. As shown in FIG. 8, the network adapter 800 communicates with other modules of the computer device 80 over the bus 808. It should be understood that, although not shown in FIG. 8, other hardware and/or software modules may be used in conjunction with the computer device 80. The hardware and/or software includes, but is not limited to, microcode, device drivers, redundant processing units, external disk drive arrays, RAID systems, tape drive and data backup storage system.

The processing unit 806 is configured to execute various functional applications and data processing by running programs stored in the system memory 810, for example, implementing the method provided in embodiments of the present disclosure.

With the computer device according to embodiments of the present disclosure, a query input by a user and a reference text content selected by the user from search results corresponding to the query can be acquired. A term vector of the query can be generated according to a term relative to the query in the reference text content. The concern of the user can be determined from a plurality of reference concerns according to similarities between the term vector of the query and term vectors of the plurality of reference concerns. The text content matched with the concern of the user can be recommended to the user. Therefore, user's concern may be identified automatically, such that a rapid, effective and precise personalization information recommendation can be realized, thereby improving an accuracy for identifying a concern and recommending contents.

In order to achieve the above embodiments, the present disclosure also provides a non-transitory computer readable storage medium storing computer programs, when the computer programs are executed by a processor, the method provided in embodiments of the present disclosure is performed.

In order to achieve the above embodiments, the present disclosure also provides a computer program product storing instructions, when the instructions are executed by a processor, the method provided in embodiments of the present disclosure is performed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for recommending a text content based on a concern, comprising:
    acquiring a query input by a user, and acquiring a reference text content selected by the user from search results corresponding to the query;
    generating a term vector of the query according to a term relative to the query in the reference text content;
    determining the concern of the user from a plurality of reference concerns according to similarities between the term vector of the query and term vectors of the plurality of reference concerns; and
    recommending the text content matched with the concern to the user;
    wherein recommending the text content matched with the concern to the user comprises:
        identifying a text concern for each of candidate text contents; and
        if a target text content having the text concern matched with the concern of the user is identified from the candidate text contents, recommending the target text content to the user;
    wherein identifying a text concern for each of candidate text contents comprises:
        performing a principal component analysis on the plurality of reference concerns, and acquiring a principal component and a non-principal component of each of the plurality of reference concerns, in which a semantic significance of the principal component is greater than a semantic significance of the non-principal component;
        matching the candidate text contents to the principal component of each of the plurality of reference concerns by using a matching rule corresponding to the principal component, and matching the candidate text contents to the non-principal component of each of the plurality of reference concerns by using a matching rule corresponding to the non-principal component, so as to acquire candidate concerns;
        computing explicit semantic similarities between the candidate concerns and the candidate text contents;
        computing implicit semantic similarities between the candidate concerns and the candidate text contents;
        acquiring overall similarities between the candidate concerns and the candidate text contents by using a linear weighting according to the explicit semantic similarities and the implicit semantic similarities; and
        determining the text concern for each of the candidate text contents from the candidate concerns according to the overall similarities.

2. The method according to claim 1, wherein computing explicit semantic between of the candidate concerns and the candidate text contents comprises:
    computing the explicit semantic similarities according to term vectors of the candidate text contents and term vectors of the candidate concerns.

3. The method according to claim 1, wherein computing implicit semantic similarities between the candidate concerns and the candidate text contents comprises:
    inputting the candidate text contents into an implicit semantic predicting model, and acquiring relevancies between the candidate text contents and the candidate concerns, in which the implicit semantic predicting model is pre-trained by performing an implicit semantic training using a concern-tagged training text.

4. The method according to claim 1, wherein after the concern of the user is determined from the plurality of reference concerns according to similarities between the term vector of the query and term vectors of the plurality of reference concerns, the method comprises:
    determining a reference concern having a similar semanteme as the query from the plurality of reference concerns as the concern of the user.

5. The method according to claim 1, wherein after the concern of the user is determined from the plurality of reference concerns according to similarities between the term vector of the query and term vectors of the plurality of reference concerns, the method comprises:
    determining a reference concern relative to a hot spot as the concern of the user.

6. The method according to claim 1, wherein acquiring a query input by a user comprises:
    acquiring the query from a browsing log of at least one of a search engine and an application.

7. The method according to claim 2, wherein the term vector of the candidate text content are computed by:
    performing a segmentation on the candidate text content to acquire segmented terms;
    computing a number of occurrences of each segmented term in the candidate text content;
    acquiring at least one segmented term with the number of occurrences greater than a threshold; and
    generating the term vector of the candidate text content according to the at least one segment term with the number of occurrences greater than a threshold.

8. The method according to claim 3, wherein training the implicit semantic predicting model by performing an implicit semantic training using a concern-tagged training text comprises:
    taking a concern corresponding to the concern-tagged training text and a result predicted under an explicit semanteme as a positive example;
    taking a random concern and a result not selected under the explicit semanteme as a negative example;

performing a model training using deep neural networks or a machine learning model according to the positive example and the negative example to generate the implicit semantic predicting model.

9. A computer device, comprising:
a processor; and
a memory configured to store executable computer programs;
wherein,
when the processor executes the computer programs, the method including:
acquiring a query input by a user, and acquiring a reference text content selected by the user from search results corresponding to the query;
generating a term vector of the query according to a term relative to the query in the reference text content;
determining the concern of the user from a plurality of reference concerns according to similarities between the term vector of the query and term vectors of the plurality of reference concerns; and
recommending the text content matched with the concern to the user, is performed;
wherein recommending the text content matched with the concern to the user comprises:
identifying a text concern for each of candidate text contents; and
if a target text content having the text concern matched with the concern of the user is identified from the candidate text contents, recommending the target text content to the user;
wherein identifying a text concern for each of candidate text contents comprises:
performing a principal component analysis on the plurality of reference concerns, and acquiring a principal component and a non-principal component of each of the plurality of reference concerns, in which a semantic significance of the principal component is greater than a semantic significance of the non-principal component;
matching the candidate text contents to the principal component of each of the plurality of reference concerns by using a matching rule corresponding to the principal component, and matching the candidate text contents to the non-principal component of each of the plurality of reference concerns by using a matching rule corresponding to the non-principal component, so as to acquire candidate concerns;
computing explicit semantic similarities between the candidate concerns and the candidate text contents;
computing implicit semantic similarities between the candidate concerns and the candidate text contents;
acquiring overall similarities between the candidate concerns and the candidate text contents by using a linear weighting according to the explicit semantic similarities and the implicit semantic similarities; and
determining the text concern for each of the candidate text contents from the candidate concerns according to the overall similarities.

10. The computer device according to claim 9, wherein computing explicit semantic between of the candidate concerns and the candidate text contents comprises:
computing the explicit semantic similarities according to term vectors of the candidate text contents and term vectors of the candidate concerns.

11. The computer device according to claim 9, wherein computing implicit semantic similarities between the candidate concerns and the candidate text contents comprises:
inputting the candidate text contents into an implicit semantic predicting model, and acquiring relevancies between the candidate text contents and the candidate concerns, in which the implicit semantic predicting model is pre-trained by performing an implicit semantic training using a concern-tagged training text.

12. The computer device according to claim 9, wherein after the concern of the user is determined from the plurality of reference concerns according to similarities between the term vector of the query and term vectors of the plurality of reference concerns, the method comprises:
determining a reference concern having a similar semanteme as the query from the plurality of reference concerns as the concern of the user.

13. The computer device according to claim 9, wherein after the concern of the user is determined from the plurality of reference concerns according to similarities between the term vector of the query and term vectors of the plurality of reference concerns, the method comprises:
determining a reference concern relative to a hot spot as the concern of the user.

14. The computer device according to claim 10, wherein the term vector of the candidate text content are computed by:
performing a segmentation on the candidate text content to acquire segmented terms;
computing a number of occurrences of each segmented term in the candidate text content;
acquiring at least one segmented term with the number of occurrences greater than a threshold; and
generating the term vector of the candidate text content according to the at least one segment term with the number of occurrences greater than a threshold.

15. The computer device according to claim 11, wherein training the implicit semantic predicting model by performing an implicit semantic training using a concern-tagged training text comprises:
taking a concern corresponding to the concern-tagged training text and a result predicted under an explicit semanteme as a positive example;
taking a random concern and a result not selected under the explicit semanteme as a negative example;
performing a model training using deep neural networks or a machine learning model according to the positive example and the negative example to generate the implicit semantic predicting model.

16. A non-transitory computer readable storage medium storing one or more computer programs, that when the computer programs are executed by a processor, cause the processor to perform the method including:
acquiring a query input by a user, and acquiring a reference text content selected by the user from search results corresponding to the query;
generating a term vector of the query according to a term relative to the query in the reference text content;
determining the concern of the user from a plurality of reference concerns according to similarities between the term vector of the query and term vectors of the plurality of reference concerns; and
recommending the text content matched with the concern to the user;
wherein recommending the text content matched with the concern to the user comprises:

identifying a text concern for each of candidate text contents; and if a target text content having the text concern matched with the concern of the user is identified from the candidate text contents, recommending the target text content to the user;

wherein identifying a text concern for each of candidate text contents comprises:

performing a principal component analysis on the plurality of reference concerns, and acquiring a principal component and a non-principal component of each of the plurality of reference concerns, in which a semantic significance of the principal component is greater than a semantic significance of the non-principal component;

matching the candidate text contents to the principal component of each of the plurality of reference concerns by using a matching rule corresponding to the principal component, and matching the candidate text contents to the non-principal component of each of the plurality of reference concerns by using a matching rule corresponding to the non-principal component, so as to acquire candidate concerns;

computing explicit semantic similarities between the candidate concerns and the candidate text contents;

computing implicit semantic similarities between the candidate concerns and the candidate text contents;

acquiring overall similarities between the candidate concerns and the candidate text contents by using a linear weighting according to the explicit semantic similarities and the implicit semantic similarities; and determining the text concern for each of the candidate text contents from the candidate concerns according to the overall similarities.

* * * * *